UNITED STATES PATENT OFFICE.

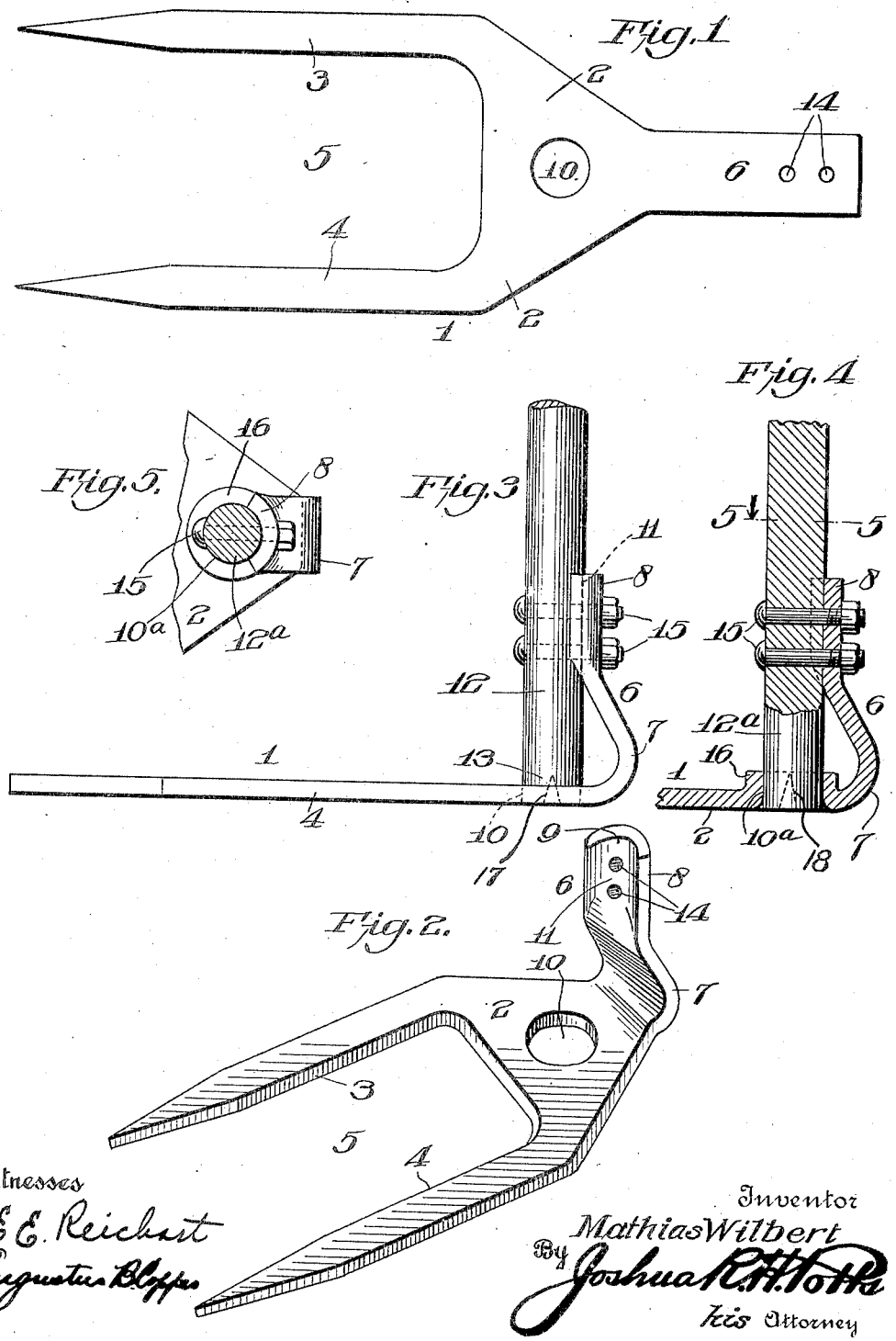

MATHIAS WILBERT, OF PHILADELPHIA, PENNSYLVANIA.

AGRICULTURAL TOOL.

1,291,327.  Specification of Letters Patent.  Patented Jan. 14, 1919.

Application filed April 22, 1918. Serial No. 229,884.

*To all whom it may concern:*

Be it known that I, MATHIAS WILBERT, a citizen of the United States, residing at Philadelphia, in the county of Philadelphia and State of Pennsylvania, have invented certain new and useful Improvements in Agricultural Tools, of which the following is a specification.

One object of my invention is to provide an agricultural tool which can be used to quickly and thoroughly dig or loosen up the ground.

Another object is to so construct my improved tool that it can be easily manipulated and will be strong and durable.

A still further object is to so construct my improved tool that a secure handle mounting will be provided which will positively prevent the handle from becoming loose during the use of the tool.

Another object is to so construct my improved tool that the base or foot portion can be cut out of sheet metal and bent to permit the ready and secure attachment of the handle.

These objects, and other advantageous ends which will be described hereinafter, I attain in the following manner, reference being had to the accompanying drawings in which Figure 1 is a top plan view of the foot portion of my improved tool showing the same in a flat state and as it can be stamped and cut out of a sheet of metal, such for example as steel, Fig. 2 is a perspective view of said foot portion after it has been bent ready to receive the handle, Fig. 3 is a side elevation of my improved tool, a portion of the handle being broken away, Fig. 4 is a fragmentary sectional elevation showing a slightly modified form of my invention, and Fig. 5 is a section taken on the line 5—5 of Fig. 4.

Referring to Figs. 1 to 3, inclusive, of the drawings, 1 represents a shoe which is preferably first cut or stamped from a sheet of metal in the form shown in Fig. 1. This shoe includes a base 2 having two prongs or tines 3 and 4 spaced apart to provide a comparatively wide opening 5. The base 2 tapers rearwardly and a tongue 6 projects from the rear of said tapered portion. This tongue is bent upwardly, as clearly shown in Figs. 2 and 3, the bending including a rearwardly curved heel portion 7. The tongue 6 inclines forwardly from said heel 7 and has its upper end portion 8 extending substantially vertical, and this portion 8 is curved or recessed in cross section, as shown at 9.

The base 2, forward of the heel 7, has a hole 10 therein, a portion of which is in alinement with the inner curved or recessed surface 11 of the tongue portion 8. A handle 12 has its lower end 13 fitting within the hole 10 and a portion of the length of said handle fits against the curved surface 11 of the tongue portion 8. This tongue portion 8 has holes 14 extending therethrough and bolts 15 extend through the handle 12 and through the holes 14.

By having the bottom end of the handle 12 extending into the hole 10 and by securing the portion 8 of the tongue to the handle 12 between its ends, it is impossible for the handle to become loose. Also, by bending the heel 7 the metal is greatly strengthened and the strength of this metal is also increased by providing the portion 8, which is curved in cross section. This latter feature not only tends to strengthen the metal but also prevents any lateral movement between the portion 8 and the handle 12.

In the use of the device, as illustrated, the tines or prongs 3 and 4 are dug into the ground in the same manner as an ordinary pick and the movement of the handle 12 causes the tines to be raised and in so doing breaks up the soil. The character of the handle mounting permits this severe action of the tool and, if desired, the prongs or tines 3 and 4 can be hardened by tempering them. Also, the heel 7 can be used to break up lumps of soil, it merely being necessary to reverse the tool by turning the handle.

In the construction shown in Fig. 4, I have shown a slight modification and it will be noted that I have provided a hole $10^a$ with an upturned annular flange 16. This can be done while the shoe is being stamped out of the sheet metal and it provides a comparatively long bearing for the bottom of the handle, it being noted that the bottom of the handle $12^a$ extends into the hole $10^a$ in the same manner as the handle 12 extends into the hole 10 in the form of my invention shown in Figs. 1 and 3. In all other respects the form of my invention shown in Figs. 4 and 5 is similar to that described in connection with Figs. 1 to 3, inclusive, and I have, therefore, given corresponding parts similar reference numbers.

In the forms of my invention shown in Figs. 3 and 4, I have illustrated wedges 17 and 18, respectively, which are driven into the portion of the handle which is confined within the hole of the shoe, and in some instances where the material is of such thickness as to confine a sufficient length of the handle within the hole to firmly secure the handle to the shoe, the bolts 15 can be eliminated.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. A tool of the character described including a base made of sheet metal and having a hole therein and an upwardly turned tongue produced by a continuation of said sheet metal; a handle having its bottom end fitting within said hole; and means for securing said tongue to the handle, said base including a portion extending rearwardly of said hole and merging into the bottom of said tongue to provide a curved heel, said tongue extending forwardly and upwardly from said heel and joining the handle above said base, substantially as described.

2. A tool of the character described including a base made of sheet metal and having a hole therein and an upwardly turned tongue produced by a continuation of said sheet metal; a handle having its bottom end fitting within said hole, said tongue having an upper portion recessed in cross section and fitting against the rear of said handle; and means for securing said portion of the tongue and handle together, said tongue including a heel extending rearwardly from said latter portion and merging into said base at a position to the rear of the junction of the handle with said base, substantially as described.

In testimony whereof I have signed my name to this specification in the presence of two subscribing witnesses.

MATHIAS WILBERT.

Witnesses:
MAY A. INGLAR,
CHAS. E. POTTS.

Copies of this patent may be obtained for five cents each, by addressing the "Commissioner of Patents. Washington, D. C."